(No Model.)
O. F. YARBROUGH.
SEED PLANTER.
No. 471,728. Patented Mar. 29, 1892.
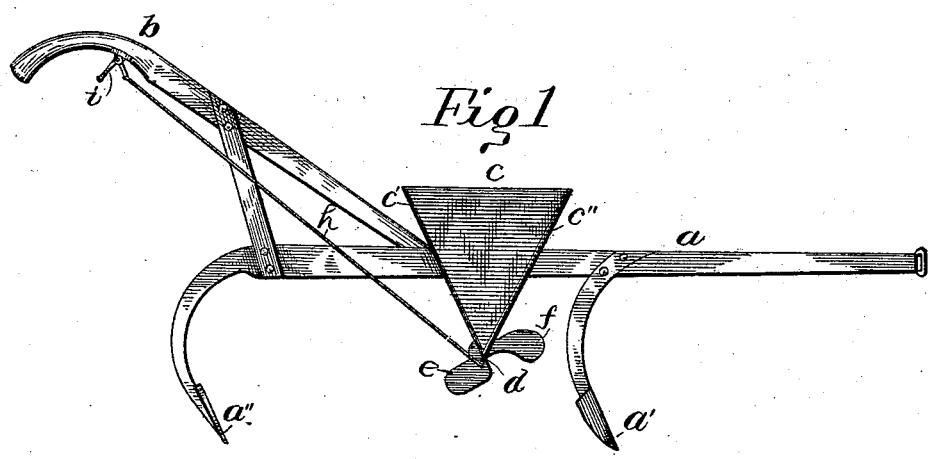
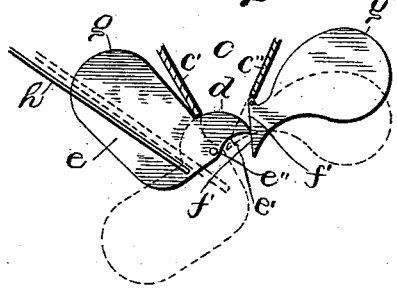
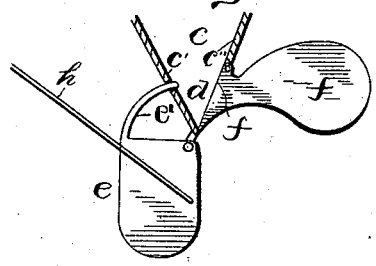
Witnesses
C. C. Burdine
Inventor
Orceneth F. Yarbrough,
per R. L. Dubois.
His Attorney.

UNITED STATES PATENT OFFICE.

ORCENETH FISHER YARBROUGH, OF DALLAS, TEXAS.

SEED-PLANTER.

SPECIFICATION forming part of Letters Patent No. 471,728, dated March 29, 1892.

Application filed August 17, 1891. Serial No. 402,799. (No model.)

*To all whom it may concern:*

Be it known that I, ORCENETH FISHER YARBROUGH, a citizen of the United States, residing at Dallas, in the county of Dallas and State of Texas, have invented certain new and useful Improvements in Corn or Seed Planters; and I do hereby declare the following to be a full, clear, and exact description of the invention, such as will enable others skilled in the art to which it appertains to make and use the same.

My invention relates to that class of corn or seed planters in which a plow or harrow may be provided with means for dropping the corn at suitable intervals; and the object sought to be accomplished is to devise more simple, durable, and effective mechanism for that purpose.

With this object in view my invention consists in the peculiar features and combinations of parts more fully described hereinafter, and pointed out in the claims.

In the accompanying drawings, Figure 1 represents a side elevation of my invention as attached to a cultivator; Fig. 2, an enlarged detail view showing the feeding-jaws open and dropping the grain, and Fig. 3 a view of a modification.

In the present instance my invention is applied to a plow or cultivator, in which the reference-letter $a$ denotes the beam, and $b$ the handle. The forward end of the beam is provided with a furrow-opening shovel $a'$ and the rear end with a cover $a''$. To the beam $a$ is secured a seed-hopper $c$, having converging front and rear walls $c'$ and $c''$ to form a funnel-shaped interior, while the side walls are vertical. The opening $d$ at the bottom of the hopper is commanded by a pair of pivoted overlapping jaws $e\ f$, which co-operate with each other in receiving and expelling a predetermined amount of seed. Each jaw has an enlarged wing $g\ g'$, the weight of which normally tends to hold them in receiving position, as shown in Fig. 1. The jaws are actuated by a wire $h$, attached to jaw $e$ at a point below the pivot $e''$ at one end and to the lower arm of an elbow-lever $i$ on the handle of the other end. The inner face $e'$ of the jaw $e$ is made substantially concave to receive a predetermined quantity of grain, and the inner face of the opposite jaw $f$ is made smooth and lies in a plane substantially parallel with the sloping inner wall of the hopper. By thus making the surface of the jaw $f$ smooth the end of the opposite jaw slides over the other in its downward movement. The jaw $e$ is pivoted so that its inner end will come in yielding contact with the smooth surface $f'$ of the opposite jaw $f$ at a point below the pivotal point of the latter for the purpose of depressing it and cutting off the required portion of the grain to be dropped from the hopper above.

In the modification shown in Fig. 3 the jaw $e$ is shown in the form of a hook adapted to pass through a transverse opening in the left-hand wall of the hopper, whereby the same function is performed.

It is evident that in place of the enlarged wings $g\ g'$, which serve to automatically restore the jaws to receiving position, springs or other means could be successfully employed, and instead of a lever and wire other means might be substituted without departing from the spirit and scope of my invention.

The operation of my device is as follows: The hopper being filled with grain and the cultivator moved forward, a small quantity of its contents is dropped by pressing upon one arm of the elbow-lever $i$. This action draws upon the wing $g$ and tilts the jaw $e$ forward, so that its upper end will come against the smooth surface of the opposite jaw $f$, and in doing so a few kernels of the grain is encompassed within the concavity lying between the two jaws. The continued pulling upon the wire $h$ depresses the jaws $e\ f$ against the gravity of wings $g\ g'$ and allows the grain to drop out, as shown in Fig. 2. Upon releasing the lever $i$ the gravity of the wings $g\ g'$ automatically opens the jaws for the reception of more seed. Hence it will be seen that the seed can be dropped at the will of the operator and deposited at the proper points regardless of the irregularities in the drilling.

A further advantage of my device is in having one jaw come into yielding contact with the other, so that the kernels of grain will not be cut or broken when caught between the jaws.

Having thus described my invention, what I claim as new, and desire to secure by Letters Patent, is—

1. In a corn-planter, the combination of a hopper, an outlet, a pair of weighted jaws commanding said outlet, and means for operating said jaws, whereby a predetermined amount of grain is expelled, substantially as set forth.

2. The combination, in a grain-planter, of a cultivator or plow provided with a hopper, a pair of jaws adapted to come in yielding contact with each other, one of the jaws being provided with a concavity and the other with a smooth surface to receive the concaved jaw, wings upon said jaws whereby they are made to automatically recover their receiving position, a wire attached to one of the jaws, and a lever secured to the cultivator-handle, to which lever the wire is fastened, all arranged and adapted to operate in the manner and for the purpose substantially as described.

3. In a grain-planter, a hopper having an outlet-opening commanded by a pair of pivoted jaws adapted to come in yielding contact with each other, one of said jaws being arranged to close against and actuate the opposite jaw, in combination with an actuating device, substantially as described.

4. In a grain-planter, a hopper provided with an outlet commanded by a pair of pivoted overlapping jaws arranged to receive and expel a predetermined amount of grain, in the manner and for the purpose substantially as described.

In testimony whereof I affix my signature in presence of two witnesses.

ORCENETH FISHER YARBROUGH.

Witnesses:
H. W. JONES,
N. M. WILLETT.